United States Patent [19]

Slagel

[11] Patent Number: 4,808,690

[45] Date of Patent: Feb. 28, 1989

[54] HIGH HEAT DISTORTION TEMPERATURE TRANSPARENT POLYURETHANES

[75] Inventor: Edwin C. Slagel, Simi Valley, Calif.

[73] Assignee: Loral Corporation, New York, N.Y.

[21] Appl. No.: 161,801

[22] Filed: Feb. 29, 1988

[51] Int. Cl.$^4$ .............................................. C08G 18/10
[52] U.S. Cl. ...................................... 528/60; 528/65; 528/66
[58] Field of Search .............................. 528/60, 65, 66

[56] References Cited

U.S. PATENT DOCUMENTS

| | | | |
|---|---|---|---|
| 2,929,800 | 3/1960 | Hill | 528/65 |
| 3,192,186 | 6/1965 | Muller et al. | 528/65 |
| 4,376,834 | 3/1983 | Goldwasser et al. | 528/65 |
| 4,476,292 | 10/1984 | Ham et al. | 528/60 |

*Primary Examiner*—Maurice J. Welsh
*Attorney, Agent, or Firm*—P. E. Milliken; D. J. Hudak

[57] ABSTRACT

A transparent polyurethane has exceptionally high heat distortion temperatures, that is at least 280° F. at 264 psi, as well as good light transmission, ultraviolet light resistance, abrasion resistance, and the like. The urethane intermediate is one or more very low equivalent weight, multifunctional hydroxy containing compounds so that when reacted with a polyisocyanate and cured with a low equivalent weight, multifunctional polyol, a highly crosslinked polyurethane is produced.

19 Claims, No Drawings

HIGH HEAT DISTORTION TEMPERATURE TRANSPARENT POLYURETHANES

FIELD OF THE INVENTION

The present invention relates to a high heat distortion (at least 280° F. at 264 psi) transparent polyurethane made from at least one very low equivalent weight multifunctional hydroxy containing intermediate and an aliphatic or aromatic polyisocyanate with the resulting prepolymer cured with a low equivalent weight multifunctional polyol curative.

BACKGROUND ART

Heretofore, transparent polyurethanes have been made from high equivalent weight polyether intermediates and polyol curing agents, U.S. Pat. No. 3,755,262. However, such polyurethanes did not adequately function at elevated temperatures or have good outdoor environmental properties.

U.S. Pat. No. 3,866,242 to Slagel relates to a protective shield against bullets or missiles consisting of a polyurethane sheet of from ¼" to ¾" thick wherein the prepolymer is made from either a polyether polyol or a polyester polyol which is cured with an aromatic amine having a methylene bridge between two aromatic rings. Utilization of the amine curing agent does not result in a suitable transparent sheet inasmuch as an amber color is produced. The amber color darkens upon further exposure to light.

SUMMARY OF THE INVENTION

It is therefore an aspect of the present invention to provide a transparent, weather-resistant polyurethane which has exceptional high heat distortion temperatures.

It is a further aspect of the present invention to provide a transparent, high heat distortion temperature polyurethane, as above, which is highly crosslinked inasmuch as multifunctional hydroxy terminated intermediates are utilized and are cured with multifunctional polyols.

It is yet another aspect of the present invention to provide a transparent, high heat distortion temperature polyurethane, as above, wherein very low equivalent weight hydroxy containing intermediates and polyol curing agents are utilized.

It is still another aspect of the present invention to provide a transparent, high heat distortion temperature polyurethane, as above, wherein an aliphatic or aromatic polyisocyanate is utilized, wherein heat distortion temperatures of at least 280° F. are readily achieved at 264 psi, wherein multifunctional hydroxy containing intermediates having an equivalent weight of 110 or less are utilized and wherein low equivalent weight polyol curing agents are utilized.

It is a still further aspect of the present invention to provide a transparent, high heat distortion temperature polyurethane, as above, which has good outdoor weathering resistance including good ultraviolet light resistance, good abrasion resistance, and the like.

These and other aspects of the present invention will be better understood by reference to the following detailed description.

In general, a transparent, high heat distortion temperature polyurethane, comprising a polyurethane, said polyurethane made from a polyol cured prepolymer, said prepolymer made from a polyisocyanate and at least one multifunctional hydroxy containing intermediate, said hydroxy containing intermediate and said polyol curing agent having an effective low equivalent weight so that said polyurethane has a heat distortion temperature of at least 280° F. at 264 psi.

DETAILED DESCRIPTION

The exceptionally high heat distortion temperature, good weather resistant polyurethanes of the present invention are obtained from prepolymers made from very low equivalent weight, generally high functional hydroxy containing intermediates. The hydroxy containing intermediates can be polyhydric alcohols, polyester polyols, or desirably a blend thereof. The intermediates of the present invention are not derived solely from a polyester polyol, or a polyether polyol in that they contain a nonpolymeric compound such as a polyhydric alcohol.

The polyhydric alcohols generally contain from 2 to 8 hydroxy groups and preferably from 3 or 4. The total number of carbon atoms in the polyhydric alcohol is from 2 to about 12 with from 2 to about 7 being preferred. Examples of suitable polyhydric alcohols include various glycols such as ethylene glycol, various triols such as glycerine, trimethylol propane, and the like, various tetraols such as pentaerithritol, and the like, as well as other higher hydroxy containing polyhydric alcohols. Trimethylol propane is preferred.

Inasmuch as it is an important aspect of the present invention to achieve a high crosslink density in order that high heat distortion temperatures can be obtained, the overall hydroxyl equivalent weight or blend weight of the polyhydric polyol intermediate is very low as from about 40 to 110, desirably from about 40 to 70, and preferably from about 45 to about 65. That is, if more than one type of multifunctional hydroxy containing intermediate is utilized, the weights of the various intermediates are such that the average equivalent weight, that is the overall equivalent weight of the blend, is within the above-noted ranges. Hence, various molecular weight polyhydric alcohol intermediates can be utilized which can be lower, within the above-noted ranges, or even higher so long as the overall or blend intermediate equivalent weight is as noted. Inasmuch as a rigid, brittle polyurethane may be obtained when polyhydric alcohols are utilized as the only intermediate, it is desirable to utilize a polyester polyol intermediate therewith. Although some sacrifice is made with regard to the heat distortion temperatures, a tough durable weather resistant polyurethane is achieved. The utilization of a polyester polyol intermediate also tends to render the polyhydric alcohol more compatible with the polyisocyanate with regard to achieving a controlled reaction rate.

The polyester polyol intermediates of the present invention also desirably have a low equivalent weight so that a highly crosslinked polyurethane can be made. The polyester intermediate can be the ester product of various lactones having from about 4 to about 9 carbon atoms with 6 carbon atoms, that is caprolactone, being preferred. The various lactones are reacted with the above-noted polyhydric alcohols such as trimethylol propane to form an ester thereof such as a polycaprolactone polyester polyol. The various polylactones or derivatives thereof formed by reaction with a polyhydric alcohol are preferred.

Another type of polyester polyol intermediate which can be utilized is the reaction product of a polycarboxylic acid with a polyhydric alcohol (e.g., those set forth hereinabove). The various polycarboxylic acids can have 2 to 12 carbon atoms with from 4 to 6 carbon atoms being preferred. The functionality of the polycarboxylic acid is from 2 to 4 with 2 being preferred. Thus, the high functionality of the intermediate is generally derived from the polyhydric alcohol.

As noted above, the highly crosslinked polyurethanes of the present invention are generally obtained by utilizing blends or mixtures of intermediates, that is the above-noted polyester polyol compounds with the above-noted polyhydric alcohols. The amount of the various components of the blended intermediate, that is the polyhydric alcohol and the various polyester polyols can vary with regard to one another depending upon their equivalent weight such that the overall equivalent weight of the intermediate is sufficient to produce a high heat distortion temperature at 264 psi of at least 280° F. Such an overall equivalent weight, as noted above, is usually from about 40 to about 110, and so forth. Thus, the amount of polyester polyol in the intermediate blend is generally from about 10 percent to about 90 percent by weight and more often from about 30 percent to about 70 percent by weight. The amount of the polyhydric alcohol is the difference. Inasmuch as blends of the polyhydric alcohol intermediate and polyester polyol intermediate are generally desired, polyurethanes can generally be tailor-made with regard to a specific high heat distortion temperature and good weather properties. That is, generally the utilization of a low molecular weight polyhydric alcohol will contribute to high heat distortion temperatures. Utilization of the polyester intermediates will contribute to good weather resistant properties.

The type and functionality of the curing agent discussed hereinbelow contributes to the high heat distortion temperature of the polyurethane as does the equivalent weight of the intermediate. According to the present invention, heat distortion temperatures of the polyurethane at 264 psi of from at least 280° F. to about 360° F., desirably from about 280° F. to about 340° F., and preferably from about 280° F. to about 320° F. are achieved.

The prepolymer of the present invention is formed by reacting the intermediate with an aliphatic or cycloaliphatic polyisocyanate and less desirably an aromatic or an alkyl aromatic polyisocyanate. The polyisocyanate generally has the formula $R-(NCO)_n$, where R is an aliphatic, a cycloaliphatic group, an aromatic, or an alkyl substituted aromatic, preferably an alkyl or a cycloalkyl group. The number of isocyanate groups, that is "n" is usually from 2 to 4, with 2 being preferred. The preferred aliphatic or cycloaliphatic polyisocyanate generally has from 4 to 18 carbon atoms, with from 6 to 14 carbon atoms being preferred. The aromatic or alkyl substituted aromatic polyisocyanate has from 6 to 15 and preferably from 7 to 12 carbon atoms. Examples of suitable polyisocyanates include the various cyclohexylene diisocyanates, the various cyclopentylene diisocyanates, the various toluene diisocyanates, with 4,4'-methylene bis(cyclohexylisocyanate) being preferred. The 4,4'-methylene bis (cyclohexylisocyanate) contains cis and trans isomers and is commercially available as Desmodur W from Mobay. Since the trans-trans isomer of 4,4-methylene bis (cyclohexylisocyanates) yield a much higher heat distortion temperature than do the other isomers, products containing high amounts of the trans-trans isomer are preferred.

The amount of the isocyanate utilized in the prepolymer is generally high with regard to the amount of hydroxyl groups of the hydroxy containing intermediate compound. That is, the equivalent ratio of isocyanate groups to hydroxyl groups is from about 2 to 12, desirably from about 2 to about 10, preferably from about 2 to 9, with from about 2 to about 8 being an optimum ratio. The prepolymer reaction is carried out at from about 250° F. to about 280° F. although higher or lower temperatures can be utilized.

The polyol curing agents of the present invention desirably have low equivalent weights and accordingly are low molecular weight and/or high functional polyols. The polyols can be a polyester or a polyhydric alcohol as set forth hereinabove and thus are hereby fully incorporated by reference for purposes of brevity. Generally, the polyhydric alcohols are preferred due to their low molecular weight, that is from about 40 to about 110, desirably from 40 to 70, and preferably from 45 to 65, e.g., trimethylol propane, although the various polyester polyols, or blends thereof, can be utilized as the polyol curing agent.

In order to maintain or achieve the high crosslinked density of the polyurethane, polyol curing agents having an equivalent weight as low as possible are preferred. The functionality of the overall polyol or blends thereof, is from about 2.5 to about 8 with a functionality of about 3 to about 4 being preferred. The equivalent ratio of the polyisocyanate to the polyol curing agent is generally from about 0.9 to about 1.1, desirably from about 0.96 to about 1.05, and preferably is a slight excess as about 1.02.

The polyurethanes of the present invention, as noted above, have excellent high heat distortion temperatures, that is at least 280° F. at 264 psi. Such polyurethanes also have good outdoor or environmental properties, for example good chemical resistance, good ultraviolet light resistance, and the like. The polyurethanes of the present invention also have good abrasion resistance and often is better than polycarbonate and polyacrylate. Notable features of the polyurethanes of the present invention are that they have very good light transmission capabilities. For example, a typical 0.125 to 0.250 inch thick casting will exhibit a 90 percent luminous transmission and 2.0 percent haze. Utility includes utilization as glazings on aircraft, as an outer protective layer for a transparent composite, i.e., canopy for advanced military aircraft, and the like. An important aspect of the polyurethane materials of the present invention is that they are castable. Moreover, although a prepolymer formulation method has been described, the various ingredients and components of the present invention can be prepared in a "one shot" process, that is, the various compounds can be added to a reaction vessel and reacted to form the polyurethane.

It is noted that various compounding agents, processing aids, and the like, can be added to the formulation in conventional amounts. Thus, various antioxidants, U.V. stabilizers, pigments, dyes, and the like can be utilized in the formulation of the present invention.

The invention will be better understood by reference to the following examples.

EXAMPLE 1

Prepolymer Preparation

1. Charge 94.2 grams of Desmodur-W, 2.5 grams of trimethylol propane and 3.3 grams of Union Carbide Tone 0301 (a polycaprolactone-trimethylol propane ester) to a resin reactor.
2. Start dry nitrogen purge, stirrer and heat batch to 225° F. and allow to exotherm.
3. Control batch temperature between 250° and 270° F. for one hour.
4. Cool batch to room temperature and seal with dry nitrogen atmosphere.
5. Determine amine equivalent per ASTM D1638-61T.

(Theory equivalent weight is 160.)

Cast Sheet Preparation

1. To 100 grams of the above prepolymer add 22.2 grams of trimethylol propane and 11.5 grams of Union Carbide Tone 0301.
2. Mix until clear, degas and cast between polycarbonate sheets.
3. Cure one hour at 190° F. and remove from cell.
4. Postcure 18 hours at 320° F. The resulting sheet will exhibit a heat distortion temperature of 280° F. at 264 psi per ASTM D648-1982.

EXAMPLE 2

Prepolymer Preparation

1. Charge 95.1 grams of Desmodur-W, 3.3 grams of trimethylolpropane and 1.7 grams of Union Carbide Tone 0301 to a resin reactor.
2. Start dry nitrogen purge, stirrer and heat batch to 225° F. and allow to exotherm.
3. Control batch temperature between 250° and 270° F. for one hour.
4. Cool batch to room temperature and seal with dry nitrogen blanket.
5. Determine amine equivalent per ASTM D1638-61T.

(Theory Equivalent weight is 158.7).

Cast Sheet Preparation

1. To 100 grams of the above prepolymer add 22.4 grams of trimethylolpropane and 11.6 grams of Union Carbide Tone 0301.
2. Mix until clear, degas and cast between polycarbonate sheet.
3. Cure one hour at 190° F. and remove from cell.
4. Postcure 18 hours at 320° F. The resulting sheet will exhibit a heat distortion temperature of approximately 300° F. at 264 psi per ASTM D647-1982.

As apparent from the above, very high heat distortion temperatures have been obtained.

While in accordance with the patent statutes, the best mode and preferred embodiment has been set forth, the scope of the invention is not limited thereto, but rather by the scope of the attached claims.

What is claimed is:

1. A transparent, high heat distortion temperature polyurethane, comprising:
a polyurethane, said polyurethane made from a polyol curing agent and a prepolymer, said prepolymer made from a polyisocyanate and at least one multifunctional hydroxy containing intermediate, said hydroxy containing intermediate being a polyhydric alcohol having from 2 to 8 hydroxyl groups and a total of from 2 to 12 carbon atoms, or a polyester polyol made from a lactone having from 4 to 9 carbon atoms and said polyhydric alcohol, or a polyester polyol made from a polycarboxylic acid having from 2 to 4 carboxylic acid groups and containing from 2 to 12 carbon atoms and said polyhydric alcohol, or combinations thereof, said hydroxy containing intermediate having an effective low hydroxyl equivalent weight so that said polyurethane has a heat distortion temperature of at least 280° F. at 264 psi, said polyol curing agent having a low hydroxyl equivalent weight, and said polyol curing agent being a polyhydric alcohol having from 2 to 8 hydroxyl groups and a total of from 2 to 12 carbon atoms, a polyester polyol made from a lactone having from 4 to 9 carbon atoms and said polyhydric alcohol, or a polyester polyol made from a polycarboxylic acid having from 2 to 4 carboxylic acid groups and containing from 2 to 12 carbon atoms and said polyhydric alcohol, or combinations thereof.

2. A transparent, high heat distortion temperature polyurethane according to claim 1, wherein said polyisocyanate has the formula $R(NCO)_n$ wherein R is an aliphatic or a cycloaliphatic having from 4 to 18 carbon atoms or an aromatic or an alkyl substituted aromatic having from 6 to 15 carbon atoms, or combinations thereof, and where n is from 2 to 4, and wherein the equivalent ratio of said polyisocyanate to said hydroxy containing intermediate is from about 2 to about 12.

3. A transparent, high heat distortion temperature polyurethane according to claim 2, wherein said heat distortion temperature is from 280° F. to about 360° F. at 264 psi, and wherein the equivalent ratio of said prepolymer to said polyol curing agent is from about 0.9 to about 1.1.

4. A transparent, high heat distortion temperature polyurethane according to claim 3, wherein said heat distortion temperature is from about 285° F. to about 340° F. at 264 psi.

5. A transparent, high heat distortion temperature polyurethane according to claim 4, wherein said polyhydric alcohol of said hydroxy containing intermediate and said polyol curing agent has from about 3 to about 4 hydroxyl groups and from 2 to about 7 carbon atoms, wherein said polycarboxylic acid forming said polyester of said hydroxy containing intermediate and said polyol curing agent has from 4 to 6 carbon atoms, wherein R of said polyisocyanate is an alkyl or a cycloalkyl having from 6 to 14 carbon atoms, wherein n is 2, and wherein said equivalent ratio of said polyisocyanate to said hydroxy containing intermediate is from about 2 to about 10.

6. A transparent, high heat distortion temperature polyurethane according to claim 5, wherein said heat distortion temperature is from about 290° F. to about 320° F. at 264 psi, and wherein said polyisocyanate is 4,4'-methylene bis(cyclohexylisocyanate).

7. A transparent, high heat distortion temperature polyurethane according to claim 6, wherein said hydroxy containing intermediate is a blend of trimethylol propane and an ester of trimethylol propane and caprolactone, wherein said polyol curing agent is a blend of trimethylol propane and an ester of trimethylol propane and caprolactone, and wherein said equivalent ratio of said polyisocyanate to said hydroxy containing intermediate is from about 2 to about 8, and wherein said equivalent ratio of said prepolymer to said polyol curing agent is from about 0.96 to about 1.05.

8. An aircraft canopy, windshield, or window comprising an outer layer having the composition of claim 2.

9. An aircraft canopy, windshield, or window comprising an outer layer having the composition of claim 6.

10. A transparent, highly crosslinked polyurethane having a high heat distortion temperature comprising:
the highly crosslinked polyurethane having a heat distortion temperature of at least 280° F. at 264 psi, said polyurethane made from at least one low equivalent weight hydroxy containing intermediate, said hydroxy containing intermediate having an overall hydroxyl equivalent weight of from about 40 to about 110, said low equivalent weight intermediate being a polyhydric alcohol having from 2 to 8 hydroxyl groups and a total of from 2 to 12 carbon atoms, a polyester polyol made from a lactone having from 4 to 9 carbon atoms and said polyhydric alcohol, or a polyester polyol made from a polycarboxylic acid having from 2 to 4 carboxylic acid groups containing from 2 to 12 carbon atoms and said polyhydric alcohol, or combinations thereof, said hydroxy containing intermediate reacted with a polyisocyanate to form a prepolymer, said polyisocyanate having the formula R(NCO)$_n$ wherein R is an aliphatic or a cycloaliphatic having from 4 to 18 carbon atoms or an aromatic or alkyl substituted aromatic having from 6 to 15 carbon atoms and wherein n is from 2 to 4, wherein the equivalent ratio of said polyisocyanate to said hydroxy containing intermediate is from about 2 to about 12, said prepolymer being cured or partially cured with a polyol curing agent having an overall hydroxyl equivalent weight of from about 40 to about 110, said polyol curing agent being a polyhydric alcohol having from 2 to 8 hydroxyl groups and a total of from 2 to 12 carbon atoms, a polyester polyol made from a lactone having from 4 to 9 carbon atoms and said polyhydric alcohol, or a polyester polyol made from a polycarboxylic acid having from 2 to 4 carboxylic acid groups and containing from 2 to 12 carbon atoms and said polyhydric alcohol, or combinations thereof.

11. A transparent, highly crosslinked polyurethane according to claim 10, wherein said overall equivalent weight of said intermediate is from about 40 to about 70.

12. A transparent, highly crosslinked polyurethane according to claim 11, and wherein the equivalent ratio of said prepolymer to said polyol curing agent is from about 0.9 to about 1.1.

13. A transparent, highly crosslinked polyurethane according to claim 12, wherein said equivalent ratio of said polyisocyanate to said hydroxy containing intermediate is from about 2 to about 10.

14. A transparent, highly crosslinked polyurethane according to claim 13, wherein said polyhydric alcohol of said hydroxyl containing intermediate and said polyol curing agent has from 2 to 7 carbon atoms and from 3 to 4 hydroxyl groups, and wherein said polycarboxylic acid forming said polyester of said hydroxy containing intermediate and said polyol curing agent has from 4 to about 6 carbon atoms.

15. A transparent, highly crosslinked polyurethane according to claim 14, wherein said hydroxy containing intermediate is a blend of trimethylol propane and an ester of trimethylol propane and caprolactone, wherein R of said polyisocyanate is an alkyl or a cycloalkyl having from 6 to 14 carbon atoms, wherein n is 2, wherein said equivalent ratio of said polyisocyanate to said hydroxy containing intermediate is from about 2 to about 9, wherein said polyol curing agent is a blend of trimethylol propane and an ester of trimethylol propane and caprolactone, and wherein said overall equivalent weight of said hydroxy containing intermediate is from about 45 to about 65.

16. A transparent, highly crosslinked polyurethane according to claim 15, wherein said polyisocyanate is 4,4'-methylene bis (cyclohexylisocyanate).

17. A transparent, highly crosslinked polyurethane according to claim 10, wherein said polyurethane has a high heat distortion temperature of from about 280° F. to about 360° F. at 264 psi.

18. A transparent, highly crosslinked polyurethane according to claim 13, wherein said polyurethane has a high heat distortion temperature of from about 285° F. to about 340° F. at 264 psi.

19. A transparent, highly crosslinked polyurethane according to claim 15, wherein said polyurethane has a high heat distortion temperature of from about 290° F. to about 320° F. at 264 psi.

* * * * *